(12) United States Patent
Yamasaki (10) Patent No.: US 9,979,253 B2
(45) Date of Patent: May 22, 2018

(54) DRIVE APPARATUS HAVING MOTOR UNIT RECEIVED IN MOTOR CASE

(71) Applicant: DENSO CORPORATION, Kariya, Aichi-pref. (JP)

(72) Inventor: Masashi Yamasaki, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 244 days.

(21) Appl. No.: 14/861,830

(22) Filed: Sep. 22, 2015

(65) Prior Publication Data

US 2016/0094104 A1    Mar. 31, 2016

(30) Foreign Application Priority Data

Sep. 26, 2014   (JP) ................. 2014-196603

(51) Int. Cl.
| | | |
|---|---|---|
| *H02K 11/00* | (2016.01) | |
| *H02K 7/10* | (2006.01) | |
| *H02K 5/10* | (2006.01) | |
| *B62D 5/04* | (2006.01) | |
| *H02K 11/33* | (2016.01) | |

(52) U.S. Cl.
CPC .............. *H02K 5/10* (2013.01); *B62D 5/046* (2013.01); *H02K 11/0073* (2013.01); *H02K 11/33* (2016.01)

(58) Field of Classification Search
CPC ................... H02K 11/33; H02K 5/16
USPC ................... 310/68 D, 75 R, 98, 83
See application file for complete search history.

(56) References Cited

U.S. PATENT DOCUMENTS

| | | | |
|---|---|---|---|
| 2011/0091337 A1 | 4/2011 | Suzuki et al. | |
| 2015/0357886 A1* | 12/2015 | Ishizeki | F04D 25/06 310/71 |

FOREIGN PATENT DOCUMENTS

| | | | |
|---|---|---|---|
| JP | 2012070508 A | * | 4/2012 |
| JP | 2014-187760 A | | 3/2013 |
| JP | 2013-090376 A | | 5/2013 |

OTHER PUBLICATIONS

U.S. Appl. No. 14/812,767, filed Jul. 29, 2015, Hayashi, Jirou.
U.S. Appl. No. 14/861,801, filed Sep. 22, 2015, Yamasaki, Masashi.

* cited by examiner

*Primary Examiner* — Jose Gonzalez Quinones
(74) *Attorney, Agent, or Firm* — Knobbe, Martens, Olson & Bear, LLP (57) ABSTRACT

In a drive apparatus, a motor unit is received in an inside of a tubular section of a motor case, and a bottom plate section is fixed to a gear box. A closure is fitted to an inner wall of the tubular section on an inner side of an opening edge part of the motor case. A control device cover is fixed to an end part of the motor case, which is opposite from the gear box, to cover a control device. An O-ring fluid-tightly seals between the motor case and the gear box, and a bonding agent fluid-tightly seals between the control device cover and the motor case.

5 Claims, 9 Drawing Sheets

DRIVE APPARATUS HAVING MOTOR UNIT RECEIVED IN MOTOR CASE

CROSS REFERENCE TO RELATED APPLICATION

This application is based on and incorporates herein by reference Japanese Patent Application No. 2014-196603 filed on Sep. 26, 2014.

TECHNICAL FIELD

The present disclosure relates to a drive apparatus that has a motor unit and a control device and is installable to an installation subject.

BACKGROUND

Previously, in a field of a drive apparatus (an actuator), which includes a motor unit, there is known a sealing technique, which limits intrusion of water into, for example, the motor unit or an inverter that supplies an electric power to the motor unit. For example, JP5260198B2 (corresponding to US2011/0091337A1) discloses an electric compressor, which has an inverter integrated therein. In this electric compressor, a liquid gasket (liquid sealant) is filled in a groove that is formed in a flange of an inverter receiving portion to fluid-tightly seal between the flange and a closure.

The liquid sealant of JP5260198B2 (corresponding to US2011/0091337A1) is filled into and is cured in the groove that is leveled, and thereby the liquid sealant can be applicable only to a connection between two planar surfaces, which are opposed to each other in a direction perpendicular to the planar surfaces. Furthermore, the filling process of the liquid sealant causes an increased number of manufacturing steps. In contrast, a seal member, such as an O-ring and a packing, can be used in both of the connection between the planar surfaces, which are opposed to each other in the direction perpendicular to the planar surfaces, and a connection (a radial fitting) between two radially opposed surfaces, which are opposed to each other in a radial direction.

However, in a case where a drive apparatus, which includes three units, i.e., a motor case configured into a cup form, a closure for covering an opening of the motor case, and a control device cover for receiving a control device, is fixed to an installation subject, seals (sealing means) are required at three locations, respectively, which include two locations among the three units (i.e., a location between a first unit and a second unit and a location between a second unit and a third unit) and one location between the drive apparatus and the installation subject. Therefore, the locations, at each of which the waterproof quality needs to be guaranteed, are disadvantageously increased, and the number of steps for installing the seals (the sealing means) is disadvantageously increased.

SUMMARY

The present disclosure is made in view of the above disadvantages.

According to the present disclosure, there is provided a drive apparatus including a motor unit, a control device, a motor case, a closure, and a control device cover. The motor unit includes a stator, around which at least one winding is wound, a rotor, which is rotatably placed on an inner side of the stator, and a shaft, which is rotatable integrally with the rotor. The control device controls energization of the motor unit. The motor case is installable to an installation subject. The motor case is configured into a cup form and includes a tubular section and a bottom plate section, which are integrally formed, and the motor case receives the motor unit at an inside of the tubular section. The closure is fitted to an inner wall of the tubular section on an inner side of an opening edge part of the motor case, which is opposite from the bottom plate section. The control device cover is fixed to an end portion of the motor case, which is opposite from the installation subject, wherein the control device cover covers the control device. The drive apparatus has a plurality of sealing locations, at each of which intrusion of water from an outside is limited after fixation of the drive apparatus to the installation subject. The plurality of sealing locations includes two sealing locations that include: a first sealing location where a primary seal, which fluid-tightly seals between the motor case and the installation subject, is placed; and a second sealing location where a secondary seal, which fluid-tightly seals between the control device cover and the motor case, is placed.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. In the following embodiments, similar components will be indicated by the same reference numerals and will not be described redundantly for the sake of simplicity.

First Embodiment

A drive apparatus according to a first embodiment of the present disclosure will be described with reference to FIGS. 1 to 4. The drive apparatus 1 of the present embodiment is an actuator of an electric power steering system of a vehicle (e.g., an automobile) and includes a motor unit and a control device, which are integrated together. The motor unit generates a steering assist torque at the electric power steering system. The control device controls energization of the motor unit.

Figure 1:
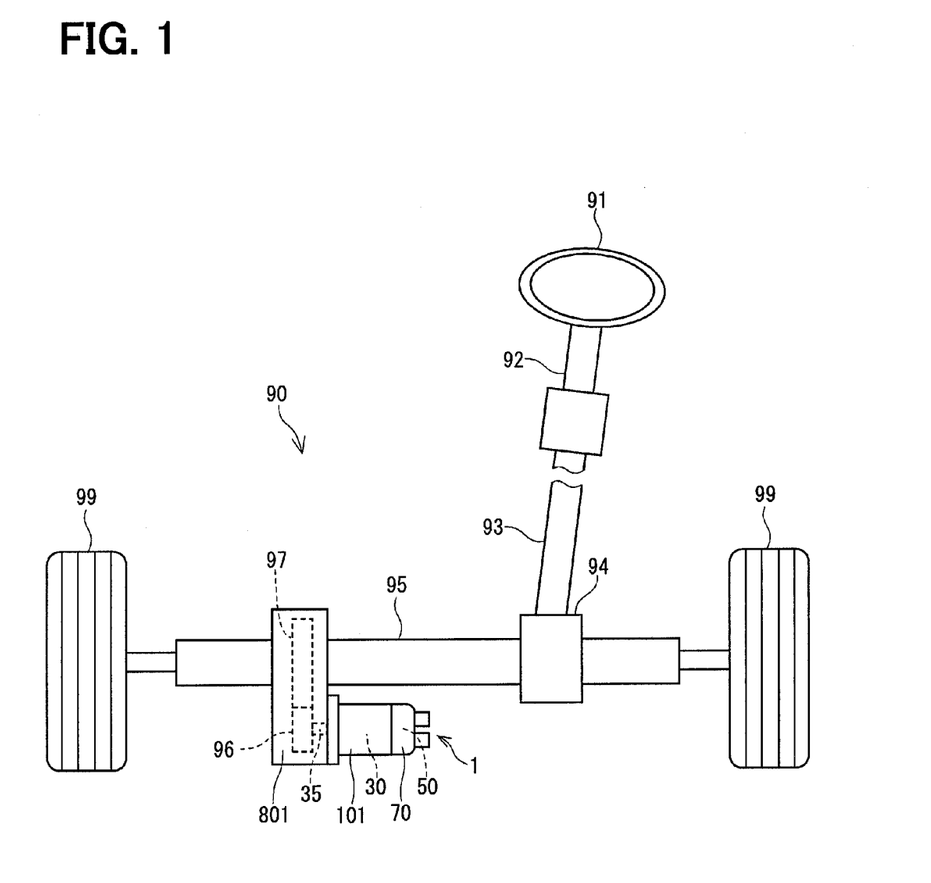
FIG. 1 is a schematic view showing an entire structure of an electric power steering system, in which a drive apparatus of each of embodiments of the present disclosure is applied.

First of all, with reference to FIG. 1, there will be described an entire structure of the electric power steering system 90, in which the drive apparatus 1 of the first embodiment and a drive apparatus of the following respective embodiments are applicable.

A steering torque of a driver of the vehicle is conducted from a steering wheel 91 to an intermediate shaft 93 through a steering shaft 92 and is then conducted to a rack and pinion mechanism 94 where a rotational movement is converted to a linear movement of a rack shaft 95. Then, two wheels 99 of the vehicle are steered to an angle that corresponds to a linear displacement of the rack shaft 95.

The electric power steering system 90 includes the drive apparatus 1 and a drive force transmission mechanism. The drive force transmission mechanism is placed in a gear box 801, which serves as an installation subject of the present disclosure. The drive force transmission mechanism transmits rotation of a drive gear 96, which is connected to a shaft 35 of the drive apparatus 1, to a driven gear 97 after reducing a rotational speed of the rotation. The rotation of the driven gear 97 assists the linear movement of the rack shaft 95 through an undepicted conversion mechanism.

The drive force transmission mechanism is not limited to the above-described mechanism, which uses the gears. For example, the drive force transmission mechanism may be a mechanism that uses, for example, a pulley (a belt drive mechanism). The installation location of the electric power steering system 90 is not limited to the one shown in FIG. 1 and may be modified to, for example, a location that is adjacent to the rack and pinion mechanism 94.

In the electric power steering system 90 of the rack installation type (i.e., the power steering system having the drive apparatus installed to the rack shaft) described above, rain water splash from a road surface, or rain water, condensed water, leaked radiator fluid, or washer fluid conducted along the rack shaft 95 may possible intrude into the drive apparatus 1, and thereby a high degree of waterproof is required. Details of the waterproof structure of the drive apparatus 1 will be described later.

The drive apparatus 1 is an electromechanical actuator (an actuator, in which the electric motor and the electronic device (electronic control device) are integrated together). The drive apparatus 1 includes a motor case 101, which receives a motor unit 30, and a control device cover 70, which covers a control device 50. One end portion of the motor case 101 is fixed to a gear box 801. The motor unit 30 of the drive apparatus 1 is, for example, a three-phase AC brushless synchronous motor of a permanent magnet type. The motor unit 30 generates a steering assist torque when a rotor, which is placed on a radially inner side of a stator, is rotated by a rotating magnetic field.

Figure 2:
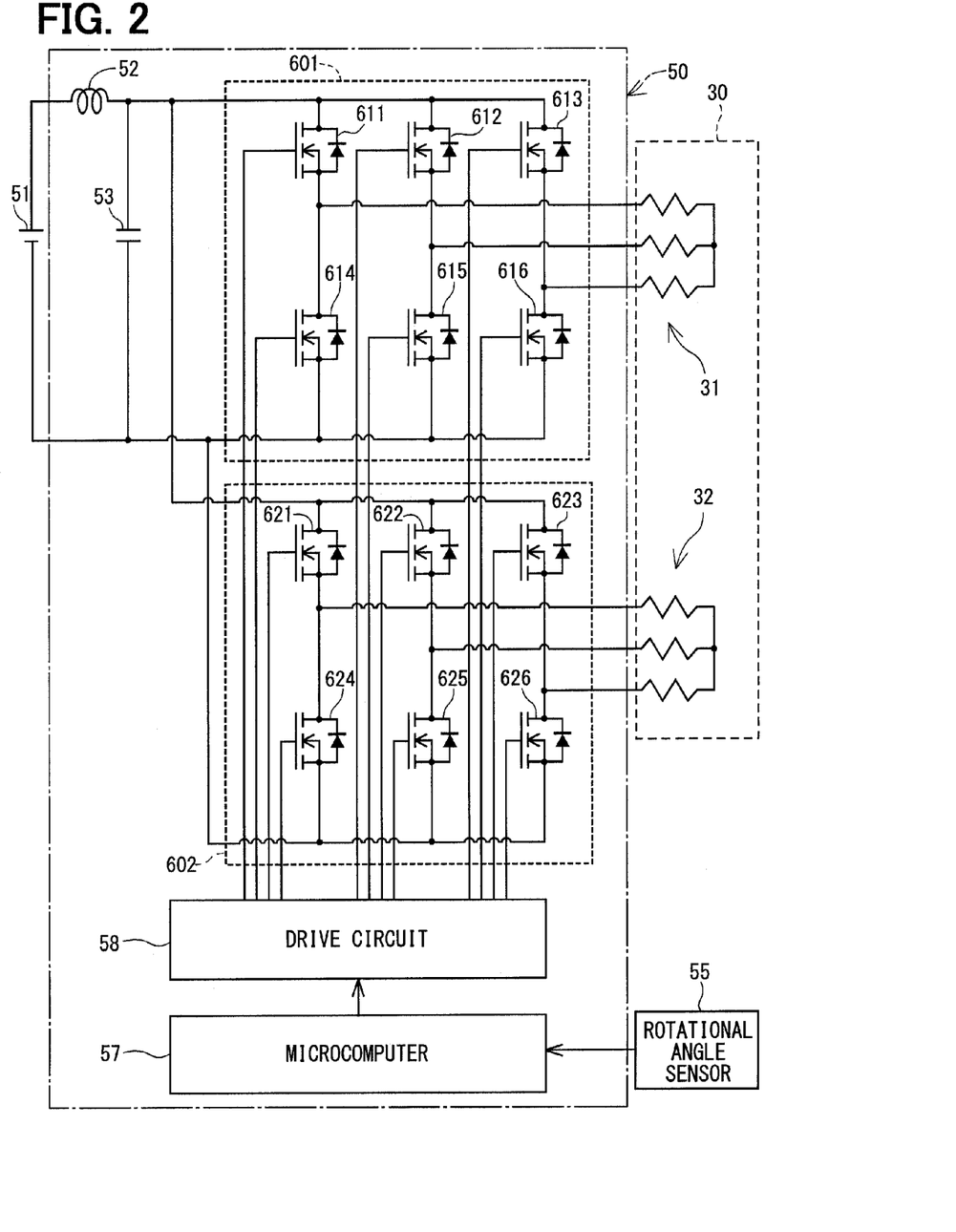
FIG. 2 is a circuit diagram showing a circuit of the drive apparatus of each of the embodiments of the present disclosure.

As shown in FIG. 2, the motor unit 30 of the present embodiment includes two sets of three-phase windings 31, 32. Inverters, each of which converts a direct current electric power of a battery 51 into a three-phase alternating current electric power, include a first system inverter 601, which correspond to a first set of windings 31, and a second system inverter 602, which corresponds to a second set of windings 32. Hereinafter, a combination of each inverter and its corresponding set of three-phase windings will be referred to as a system.

The control device 50 includes a choke coil 52, a capacitor 53, the first system inverter 601, the second system inverter 602, a microcomputer 57, and a drive circuit (a pre-driver) 58.

The choke coil 52 and the capacitor 53 form a filter circuit. The filter circuit reduces noises conducted from other apparatuses, which share the battery 51 with the drive apparatus 1, and the filter circuit also reduces noises conducted from the drive apparatus 1 to the other apparatuses, which share the battery 51 with the drive apparatus 1. The choke coil 52 smoothens pulsation of a voltage, which is outputted from the battery 51 to the inverters 601, 602.

The first system inverter 601 includes six switching elements (switching devices) 611-616, which form a bridge circuit that switches electric current supplied to the first set of windings 31. Each of the switching elements 611-616 of the present embodiment is a metal-oxide-semiconductor field-effect transistor (MOSFET).

Among the switching elements 611-616, a drain of each of the switching elements 611, 612, 613, which are placed at a high electric potential side, is connected to a cathode of the battery 51. Furthermore, a source of each of these switching elements 611, 612, 613 is connected to a drain of a corresponding one of the switching elements 614, 615, 616, which are placed at a low electric potential side. A source of each of the side switching elements 614, 615, 616, which are placed at the low electric potential side, is connected to an anode of the battery 51. A connection between each of the switching elements 611, 612, 613, which are placed at the high electric potential side, and a corresponding one of the switching elements 614, 615, 616, which are placed at the low electric potential side, is connected to one end of a corresponding one of the windings 31 of the first set.

The construction of the switching elements 621-626 of the second system inverter 602 is similar to that of the first system inverter 601 and thereby will not be described redundantly.

The microcomputer 57 computes a three phase voltage command value based on, for example, a steering torque signal received from a torque sensor (not shown), a rotational angle signal received from a rotational angle sensor 55, and a feedback electric current.

The drive circuit 58 generates a PWM signal based on the three-phase voltage command value and outputs the PWM signal to a gate of each corresponding one of the switching elements 611-616 of the inverter 601 and a gate of each corresponding one of the switching elements 621-626 of the inverter 602. When the switching elements 611-616, 621-626 perform the switching operation based on the PWM signal, a desired AC voltage is applied from each of the inverters 601, 602 to the corresponding one of the sets of windings 31, 32. Thereby, the motor unit 30 generates the steering assist torque.

Next, the structure of the drive apparatus 1 of the first embodiment will be described with reference to FIGS. 3 and 4.

Figure 3:
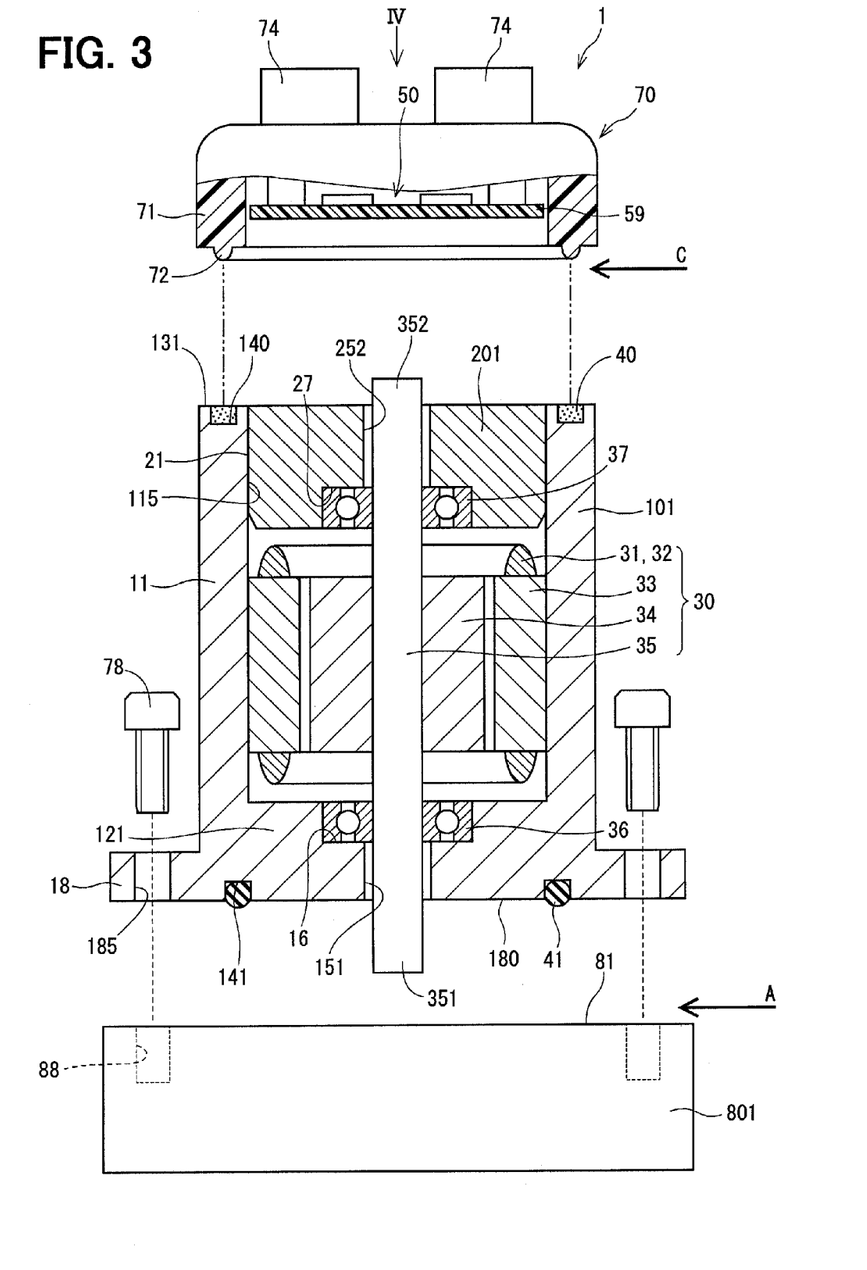
FIG. 3 is a schematic cross-sectional view of the drive apparatus according to the first embodiment.
Figure 4:
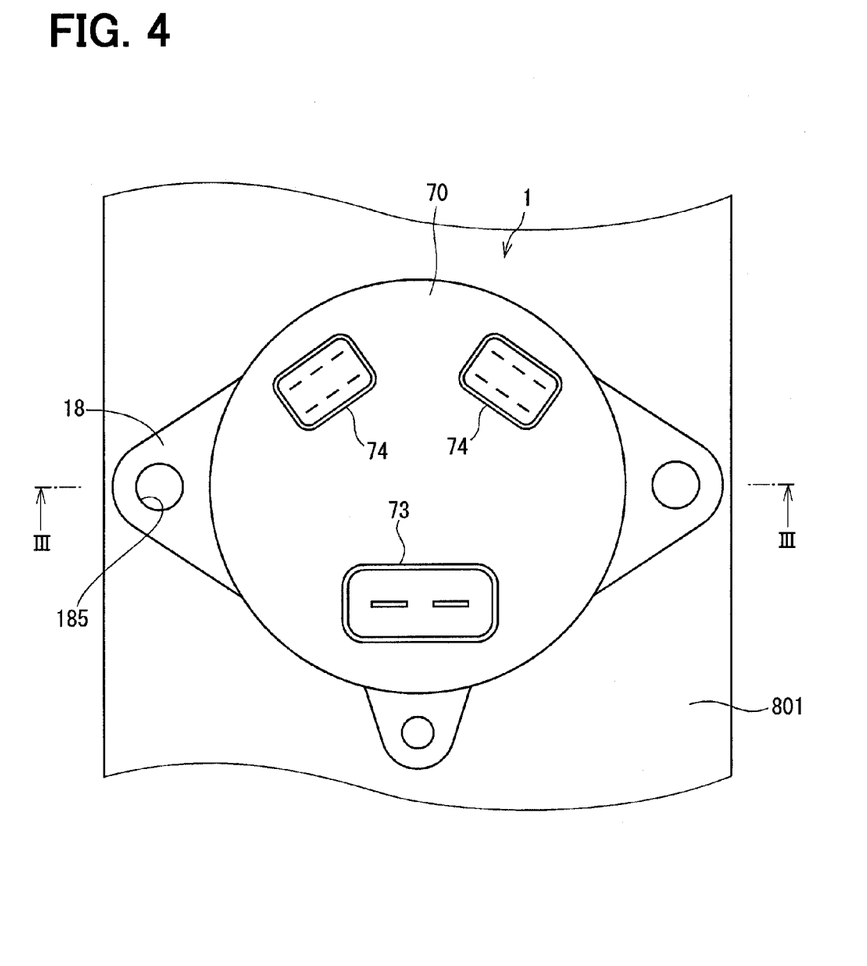
FIG. 4 is a view taken in a direction of an arrow IV in FIG. 3.

As shown in FIG. 3, the drive apparatus 1 includes the motor unit 30, the control device 50, the motor case 101, a closure 201, and the control device cover 70. An O-ring 41, which serves as a primary seal (also referred to as a primary sealing means), and a bonding agent 40, which serves as a secondary seal (also referred to as a secondary sealing means), are provided. Hereinafter, "installation" of the O-ring, which is a seal member having a predetermined shape, and "filling" or "application" of the bonding agent having no predetermined shape, will be collectively referred to as "application" of the O-ring or of the bonding agent.

In a real distribution process, the drive apparatus 1, which is manufactured by a parts manufacturer, is delivered to an automobile manufacturer, and the drive apparatus 1 is assembled to the gear box 801 at the automobile manufacturer. Therefore, as shown in FIG. 3, the gear box 801 is not present in a state before a process of assembling the motor case 101 and the control device cover 70 together. Therefore, for the descriptive purpose, the drive apparatus 1 and the gear box 801, which will be assembled together in the future, are imaginarily shown together in each corresponding drawing. In the following description, the term "gear box 801 side" refers to a side where the gear box 801 will placed in the future.

The motor case 101 is made of metal, such as aluminum, and is configured into a cup form. The motor case 101 includes a tubular section 11 and a bottom plate section 121, which are integrally formed (more specifically, seamlessly and integrally formed). The motor unit 30 is received in the inside of the tubular section 11. According to the first embodiment, in the motor case 101, the bottom plate section 121 is formed at the gear box 801 side, and the motor case 101 opens at the control device cover 70 side.

A shaft hole 151, through which the shaft 35 is received, and a recess 16, which receives a first bearing 36, are formed in a center portion of the bottom plate section 121. The first bearing 36, which is received in the recess 16, rotatably supports a corresponding portion of the shaft 35, which is located on the gear box 801 side of the rotor 34.

Two flanges 18, which outwardly project in a radial direction of the tubular section 11, are formed at two circumferential locations, respectively, in the bottom plate section 121 on the gear box 801 side. An end surface 180 of each flange 18 contacts an end surface 81 of the gear box 801, and a bolt 78 is inserted through a bolt hole 185 of each corresponding flange 18 and is threaded into a corresponding threaded hole 88 of the gear box 801. Thereby, the drive apparatus 1 is fixed to the gear box 801.

An O-ring groove 141, into which the O-ring 41 is installed, is formed in the end surface 180 of the bottom plate section 121, which is located on the gear box 801 side. In this embodiment and the following respective embodiments, the O-ring is an elastic body made of, for example, rubber (elastomer). The O-ring 41 fluid-tightly seals between the end surface 180 of the motor case 101 and the end surface 81 of the gear box 801. The seal (i.e., the O-ring 41) of this example is a face seal (also referred to as an end face seal).

An opening edge part 131 is formed around the opening of the motor case 101 located at an end portion of the motor case 101, which is opposite from the bottom plate section 121. A bonding agent groove 140, which is configured into an annular form, is formed to extend in a circumferential direction in an end surface of the opening edge part 131. When an annular projection 72 of the control device cover 70 is fitted into the bonding agent groove 140, in which the bonding agent 40 is filled, the control device cover 70 and the motor case 101 are joined together, and the connection between the control device cover 70 and the motor case 101 is fluid-tightly sealed.

The closure 201 is made of metal, such as aluminum, and is configured into a plate form. An outer wall (an outer peripheral wall) 21 of the closure 201 is fitted to an inner wall (an inner peripheral wall) 115 of the tubular section 11 on an inner side (a radially inner side) of the opening edge part 131 after installation of the motor unit 30 into the inside of the motor case 101. This fitting (fitting method) may be made by press-fit or interference fit (e.g., shrink fit) or may be made with screws or a C-ring (nor shown). Furthermore, a stepped portion, which limits a fitting depth, may be formed in the inner wall 115 of the tubular section 11 or in the outer wall 21 of the closure 201. In any of the above fitting methods, the closure 201 is fitted to the inner wall 115 of the tubular section 11 on the inner side of the opening edge part 131. In the present embodiment, the closure 201 is entirely received in the inside of the tubular section 11.

A shaft hole 252, through which the shaft 35 is received, and a recess 27, which receives a second bearing 37, are formed in a center portion of the closure 201. The second bearing 37, which is received in the recess 27, rotatably supports a corresponding portion of the shaft 35, which is located on the control device 50 side of the rotor 34.

The closure 201 of the first embodiment is placed at a location that is adjacent to a circuit board 59 of the control device 50. Therefore, the closure 59 also functions as a heat sink that receives heat generated from electric components mounted to the circuit board 59.

The motor unit 30 includes the windings 31, 32, the stator 33, the rotor 34 and the shaft 35. In the present embodiment, the motor unit 30 forms the three-phase AC brushless motor.

Each of the windings 31, 32 are made of metal (e.g., copper) and is configured into a form of a wire. The windings 31, 32 are wound around the stator 33. An end of each winding 31, 32 is received through a through-hole (not shown) formed in the closure 201 and is electrically connected to the circuit board 59 of the control device 50.

The stator 33 is made of a plurality of steel plates, which are stacked one after another. The stator 33 is configured into a general circular ring form and is fixed to the inner side of the tubular section 11. When the AC electric current flows through the windings 31, 32, a rotating magnetic field is generated at the stator 33.

Similar to the stator 33, the rotor 34 is made of a plurality of steel plates, which are stacked one after another, and the rotor 34 is configured into a generally cylindrical form and is rotatably placed on a radially inner side of the stator 33. A plurality of permanent magnets (not shown) is attached to an outer wall of the rotor 34 such that N-poles and S-poles are alternately arranged one after another at predetermined intervals in the circumferential direction.

The shaft 35 is made of, for example, metal and is configured into a cylindrical rod form. The shaft 35 is coaxial with and is fixed to the rotor 34, so that the shaft 35 is rotatable integrally with the rotor 34. In the state where the motor unit 30 is received in the motor case 101, an end portion of the shaft 35, which is located on the gear box 801 side, is referred to as a first end portion 351, and another end portion of the shaft 35, which is located on the control device 50 side, is referred to as a second end portion 352.

The first end portion 351 of the shaft 35 is connected to the drive gear 96 in the inside of the gear box 801. A magnet (not shown), which is used to sense a rotor rotational angle through a rotational angle sensor 55, is provided to the second end portion 352 of the shaft 35.

The first end portion 351 side of the shaft 35, to which the rotor 34 is installed, is rotatably supported by the first bearing 36, and the second end portion 352 side of the shaft 35 is rotatably supported by the second bearing 37. Each of the bearings 36, 37 is, for example, a radial bearing (ball bearing), which includes balls, an inner race and an outer race.

The control device 50 controls the energization of the motor unit 30 through the operation of the electric components mounted on the circuit board 59. As shown in FIG. 2, the electric components include the choke coil 52, the capacitor 53, the switching elements 611-616, 621-626 of the inverters 601, 602, and ICs, which form the microcomputer 57 and the drive circuit 58. The positions and the connections of the electric components are not the main feature of the present disclosure and thereby will not be described in detail.

The control device cover 70 is made of, for example, resin and is fixed to the end portion of the motor case 101, which is opposite from the gear box 801. The control device cover 70 covers the control device 50. An electric power supply connector 73, to which the electric power is supplied from the battery 51, and signal connectors 74, to which a CAN signal and a torque signal are supplied from an outside, are formed in an end surface of the control device cover 70, which is opposite from the motor case 101. The control device cover 70 protects the control device 50 from an external shock and limits intrusion of dust and water to the control device 50.

The annular projection 72 is formed in an end surface of a peripheral wall 71 of the control device cover 70. The projection 72 is fitted into the bonding agent groove 140 of the motor case 101, in which the bonding agent 40 is filled. In this way, the control device cover 70 is joined to the opening edge part 131 of the motor case 101 while the control device cover 70 ensures the required water tightness between the control device cover 70 and the motor case 101.

Figure 9:
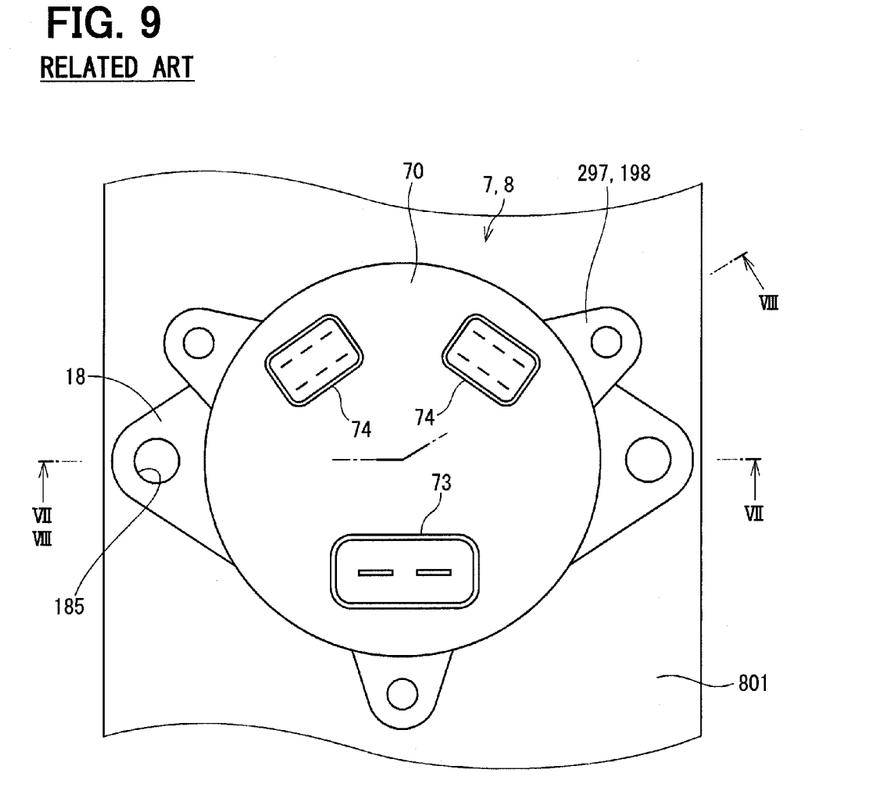
FIG. 9 is a view taken in a direction IX in FIG. 7 or FIG. 8.

Now, advantages of the drive apparatus 1 of the first embodiment will be described in relation to a drive apparatus 7 of a first comparative example shown in FIGS. 7 and 9. The drive apparatus 7 of the first comparative example is similar to the drive apparatus 1 of the first embodiment with respect to that the bottom plate section 121 is formed at the gear box 801 side of the motor case 107. However, a connection between the closure 207 and the motor case 107 is different from that of the first embodiment.

The closure 207 of the first comparative example is configured into a stepped form and includes a large diameter portion 22 and a fitting portion 237. The large diameter portion 22, which is configured into a form of a flange, contacts an opening edge part 137 of the motor case 107. An O-ring groove 247 is formed to extend in a circumferential direction in an outer wall of the fitting portion 237, and an O-ring 47 is fitted into the O-ring groove 247. When the fitting portion 237 is fitted to the inner wall 115 of the tubular section 11, a radial gap between the fitting portion 237 and the inner wall 115 of the tubular section 11 is fluid-tightly sealed by the O-ring 47. Furthermore, three flanges 297 radially outwardly project from the closure 207 at three circumferential locations, and three flanges 197 radially outwardly project from the motor case 107 at three locations, which correspond to the three locations of the flanges 297. These flanges 297, 197 are formed to fix between the closure 207 and the motor case 107 with bolts 79.

A bonding agent groove 240, which is similar to the bonding agent groove 140 formed in the opening edge part 131 of the first embodiment, is formed in an end surface of the closure 207, which is located on the control device cover 70 side, and the bonding agent 40 is filled in the bonding agent groove 240.

As discussed above, the drive apparatus 7 of the first comparative example is fixed to the gear box 801 through the bottom plate section 121 side end surface 180 of the motor case 107 in a state where the three units, i.e., the motor case 107, the closure 207, and the control device cover 70 are joined together.

Figure 7:
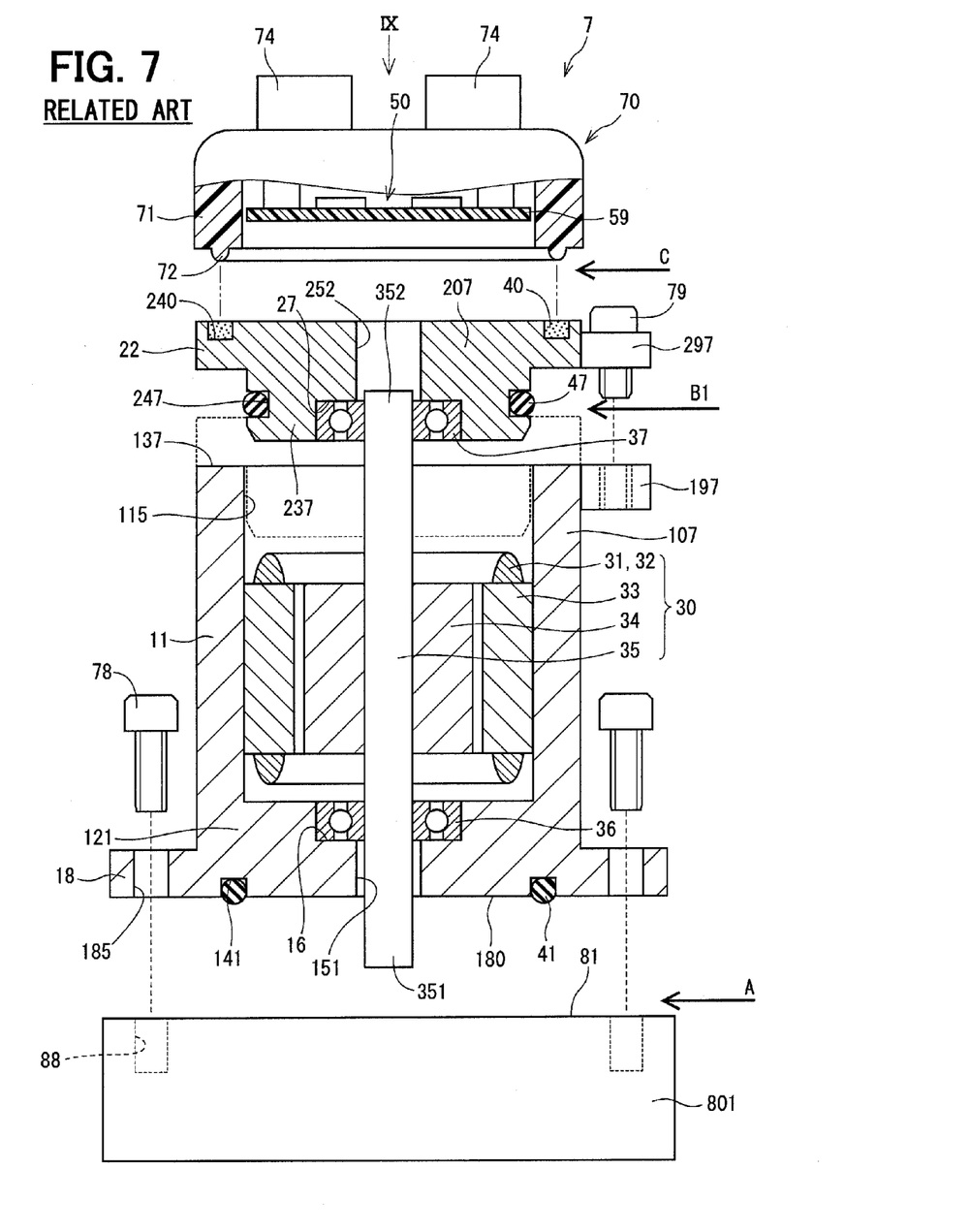
FIG. 7 is a schematic cross-sectional view of a drive apparatus of a first comparative example.

The drive apparatus 7 has three sealing locations A, B1, C, which are shown in FIG. 7 and need to have the water tightness to limit intrusion of the water from the outside. The O-ring 41 is used at the sealing location A between the motor case 107 and the gear box 801. The O-ring 47 is used at the sealing location B1 between the closure 207 and the motor case 107. The bonding agent 40 is used at the sealing location C between the control device cover 70 and the closure 207.

In the drive apparatus 1 of the first embodiment of the present disclosure, the sealing location A is similar to that of the first comparative example. However, in the drive apparatus 1 of the first embodiment, the closure 201 is constructed to be fitted to the inner wall 115 of the tubular section 11 on the radially inner side of the opening edge part 131 (in other words, the closure 201 is entirely received in the inside of the tubular section 11). Therefore, at the sealing location C, the bonding agent 40 is used to directly seal between the control device cover 70 and the motor case 101 in the drive apparatus 1 of the first embodiment. Thus, it is possible to eliminate the O-ring 47, which is the seal (the sealing means) at the sealing location B1, and thereby it is possible to reduce the number of the sealing locations to two. As a result, the locations, at each of which the waterproof quality needs to be guaranteed, are reduced, and thereby the reliability is improved. Furthermore, the number of assembling steps of the seals (sealing means) can be reduced.

The sealing location A and the sealing location C serve as a first sealing location and a second sealing location, respectively, of the present disclosure.

In the drive apparatus 1, the outer wall 21 of the closure 201 is not exposed to the outside of the drive apparatus 1, so that a surface treatment process of the closure 201 is not required.

Furthermore, when the contact surface area between the outer wall 21 of the closure 201 and the inner wall 115 is maximized, the heat generated from the electric components of the control device 50, which is received by the closure 201, can be effectively released to the gear box 801 through the tubular section 11.

In addition, in the drive apparatus 1 of the first embodiment, the bonding agent 40, which serves as the secondary seal (the secondary sealing means), is used between the control device cover 70 and the motor case 101, so that both of the sealing function and the fixing function can be simultaneously achieved with the bonding agent 40, and thereby it is not required to provide a dedicated fixing elements (fixing structure), such as bolts.

In this case, if a fixing location of, for example, the bolts, is set on an inner side of the sealing location, another sealing structure is required at a location around, for example, bolt holes, which receive the bolts. In contrast, if the fixing location is set on the outer side of the sealing location, it is required to form a flange having the bolt holes in such a manner that the flange radially outwardly projects. Then, the flange occupies the space around the motor case, and thereby this structure is not desirable in, for example, the electric power steering system that has strict limitations with respect to, particularly, the installation space thereof.

Therefore, in the case where both of the O-ring 41, which serves as the primary seal (the primary sealing means), and the bonding agent 40, which serves as the secondary seal (the secondary sealing means), are placed on the inner side of the outer contour of the motor case 101 in the radial direction, it is possible to eliminate the radially outwardly projected portion (e.g., the flange), and thereby it is possible to minimize the maximum outer diameter of the drive apparatus 1.

Second and Third Embodiments

Figure 5:
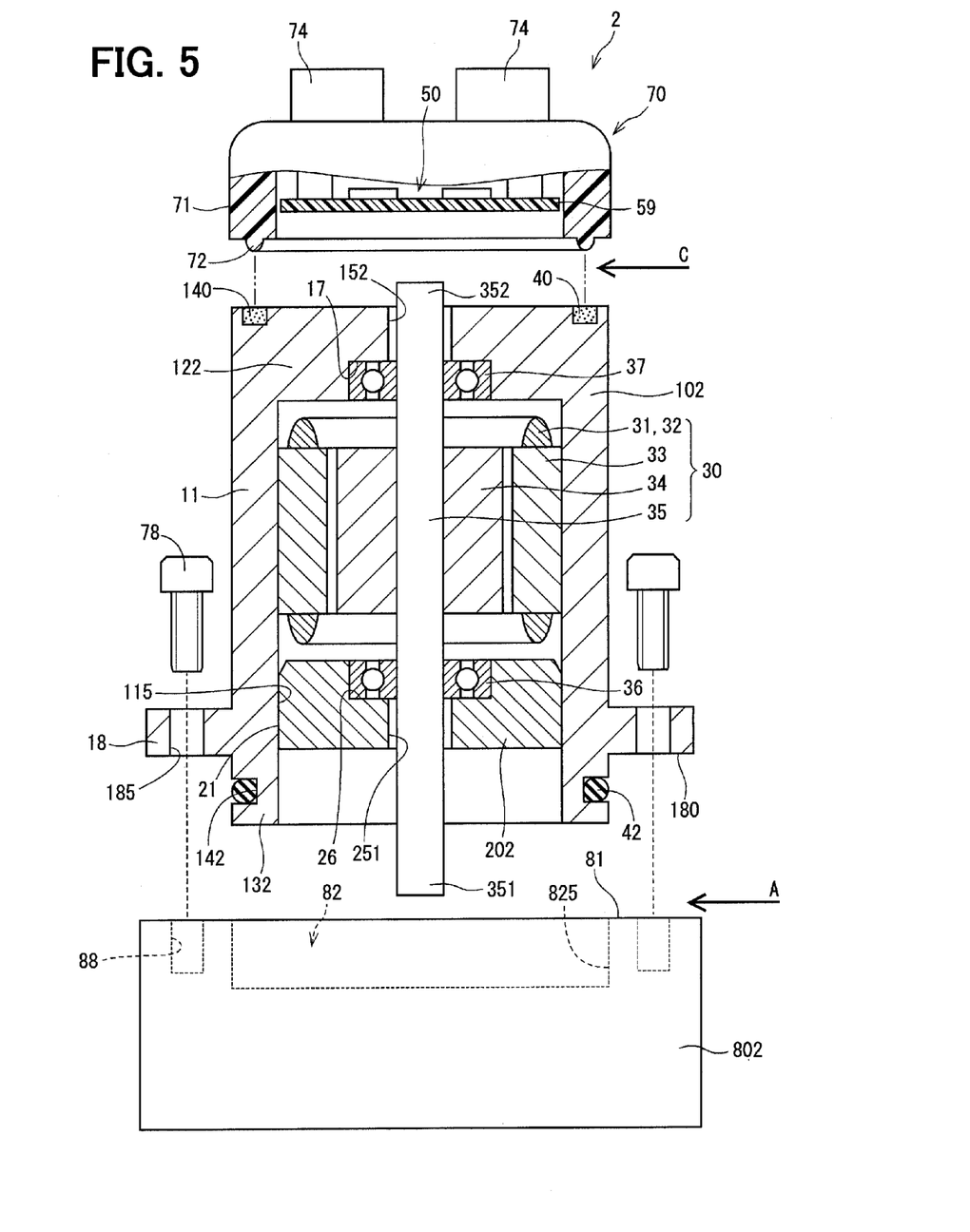
FIG. 5 is a schematic cross-sectional view of the drive apparatus according to a second embodiment of the present disclosure.
Figure 6:
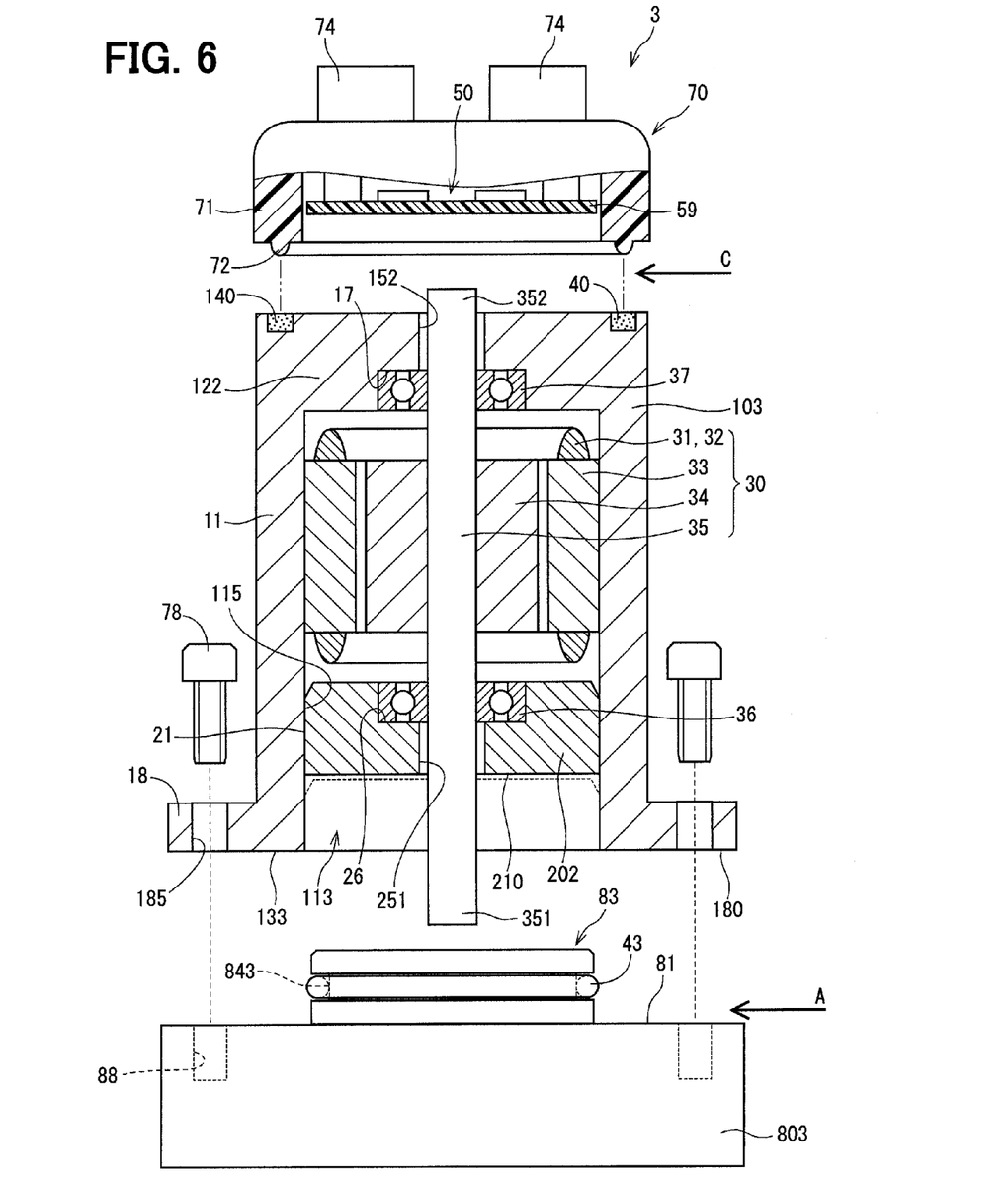
FIG. 6 is a schematic cross-sectional view of a drive apparatus according to a third embodiment of the present disclosure.

Next, a drive apparatus of a second embodiment and a drive apparatus of a third embodiment will be described with reference to FIGS. 5 and 6, respectively. The drive apparatus 2 of the second embodiment shown in FIG. 5 and the drive apparatus 3 of the third embodiment shown in FIG. 6 differ from the drive apparatus 1 of the first embodiment with respect to that the bottom plate section 122 of the motor case 102, 103 is formed at the control device cover 70 side of the motor case 102, 103. The assembling of the motor case 102, 103 with the gear box 802, 803 is also different from that of the first embodiment.

The motor case 102, 103 of the second and third embodiments is made of metal, such as aluminum, and is configured into a cup form that opens on the gear box 802, 803 side. The motor case 102, 103 includes the tubular section 11 and the bottom plate section 122, which are seamlessly and integrally formed. A shaft hole 152, which receives the second end portion 352 of the shaft 35, and a recess 17, which receives a second bearing 37, are formed in a center portion of the bottom plate section 122.

The bonding agent groove 140, which is configured into an annular form, is formed to extend in a circumferential direction in an end surface of the bottom plate section 122, which is located on the control device cover 70 side. When an annular projection 72 of the control device cover 70 is fitted into the bonding agent groove 140, in which the bonding agent 40 is filled, the control device cover 70 and the motor case 102, 103 are joined together, and the connection between the control device cover 70 and the motor case 102, 103 is fluid-tightly sealed.

The bottom plate section 122 of the second and third embodiments is placed adjacent to the circuit board 59 of the control device 50, so that the bottom plate section 122 functions as a heat sink that receives the heat generated from the electronic components mounted on the circuit board 59.

The flanges 18, which outwardly project in the radial direction of the tubular section 11, are formed at two circumferential locations, respectively, in the end portion of the motor case 102, 103 located on the gear box 802, 803 side. The end surface 180 of each flange 18 contacts an end surface 81 of the gear box 802, 803, and a bolt 78 is inserted through a bolt hole 185 of each corresponding flange 18 and is threaded into a corresponding threaded hole 88 of the gear box 802, 803. Thereby, the drive apparatus 2, 3 is fixed to the gear box 802, 803.

The closure 202 is made of metal, such as aluminum, and is configured into a plate form. The outer wall 21 of the closure 202 is fitted to the inner wall 115 of the tubular section 11 on the inner side of the opening edge part 132, 133 after installation of the motor unit 30 into the inside of the motor case 102, 103. Similar to the first embodiment, any fitting method may be used to fit the closure 202 to the inner wall of the tubular section 11.

A shaft hole 251, through which the first end portion 351 of the shaft 35 is received, and a recess 26, which receives the first bearing 36, are formed in a center portion of the closure 202.

The above-described structure is common to both of the second embodiment and the third embodiment.

Next, the structure, which is specific to the second embodiment, will be described. Specifically, in the second embodiment, the opening edge part 132 of the motor case 102 is located on the gear box 802 side of the flanges 18 and project toward the gear box 802, and an O-ring 42 is installed into an O-ring groove 142 that is formed to circumferentially extends in an outer wall (an outer peripheral wall) of the opening edge part 132. The opening edge part 132, which is projected toward the gear box 802, is fitted to an inner wall 825 of a recess 82 that is formed in the gear box 802. At this time, a radial gap between the opening edge part 132 and the inner wall 825 of the recess 82 is fluid-tightly sealed by the O-ring 42. The seal of this example is a shaft seal.

Next, the structure, which is specific to the third embodiment, will be described. Specifically, the opening edge part 133 of the motor case 103 is formed in a common surface that is common to the end surfaces 180 of the flanges 18. In other words, the end surface of the opening edge part 133 is flush with the end surfaces 180 of the flange 18. The closure 202 is fitted to the inner wall 115 of the tubular section 11, and an end surface 210 of the closure 202, which is located on the side where the opening of the tubular section 11 is placed, is located on a depth side (the bottom plate section 122 side) of the opening edge part 131. A recess 113 is formed in the inside of the tubular section 11 at a location that is on the inner side of the opening edge part 133.

A fitting portion 83 is formed in the gear box 803 such that the fitting portion 83 is configured into a tubular form and projects from the end surface 81 of the gear box 803, and an O-ring 43 is installed into an O-ring groove 843 that is formed in an outer wall of the fitting portion 83. The fitting portion 83 is fitted to the inner wall 115 of the recess 113 of the drive apparatus 3. At this time, a radial gap between the outer wall of the fitting portion 83 and the inner wall 825 of the recess 82 is fluid-tightly sealed by the O-ring 43. The seal (i.e., the O-ring 43) of this example is also a shaft seal.

Advantages of the drive apparatus 2, 3 of the second and third embodiments will be described in comparison to a second comparative example shown in FIGS. 8 and 9. The drive apparatus 8 of the second comparative example has the common feature, which is common to the drive apparatus 2, 3 of the second and third embodiments. This common feature is that the bottom plate section 122 is formed at the control device cover 70 side of the motor case 108. However, the way of joining between the closure 208 and the motor case 108 is different from that of the second and third embodiment. The gear box 801, to which the drive apparatus 8 of the second comparative example is fixed, is substantially the same as the gear box 801, to which the drive apparatus 1 of the first embodiment is fixed.

The closure 208 of the second comparative example is configured into a stepped form and includes a large diameter portion 28 and a fitting portion 238. The large diameter portion 28, which is configured into a form of a flange, contacts an opening edge part 138 of the motor case 108. An O-ring groove 248 is formed to extend in a circumferential direction in an outer wall of the fitting portion 238, and an O-ring 48 is fitted into the O-ring groove 248. When the fitting portion 238 is fitted to the inner wall 115 of the tubular section 11, a radial gap between the fitting portion 238 and the inner wall 115 of the tubular section 11 is fluid-tightly sealed by the O-ring 48. Furthermore, three flanges 298 radially outwardly project from the closure 208 at three circumferential locations, and three flanges 198 radially outwardly project from the motor case 108 at three locations, which correspond to the three locations of the flanges 298. These flanges 298, 198 are formed to fix between the closure 208 and the motor case 108 with bolts 79.

The large diameter portion 28 includes two flanges 18, which radially outwardly project from the large diameter portion 28 at two circumferential locations. An end surface 280 of the large diameter portion 28 contacts the end surface 81 of the gear box 801, and a bolt 78 is inserted through each bolt hole 285 and is threaded into the corresponding threaded hole 88 of the gear box 801. Thereby, the drive apparatus 8 is fixed to the gear box 801. Furthermore, an O-ring groove 241, which is similar to the O-ring groove 141 formed in the end surface 180 of the bottom plate section 121 of the first embodiment, is formed in the end surface 280 of the large diameter portion 28, and the O-ring 41 is fitted into the O-ring groove 241.

As discussed above, similar to the first comparative example, in the state where the three units, i.e., the closure 208, the motor case 108, and the control device cover 70 are joined together, the closure 208 is fixed to the gear box 801 at the drive apparatus 8.

Figure 8:
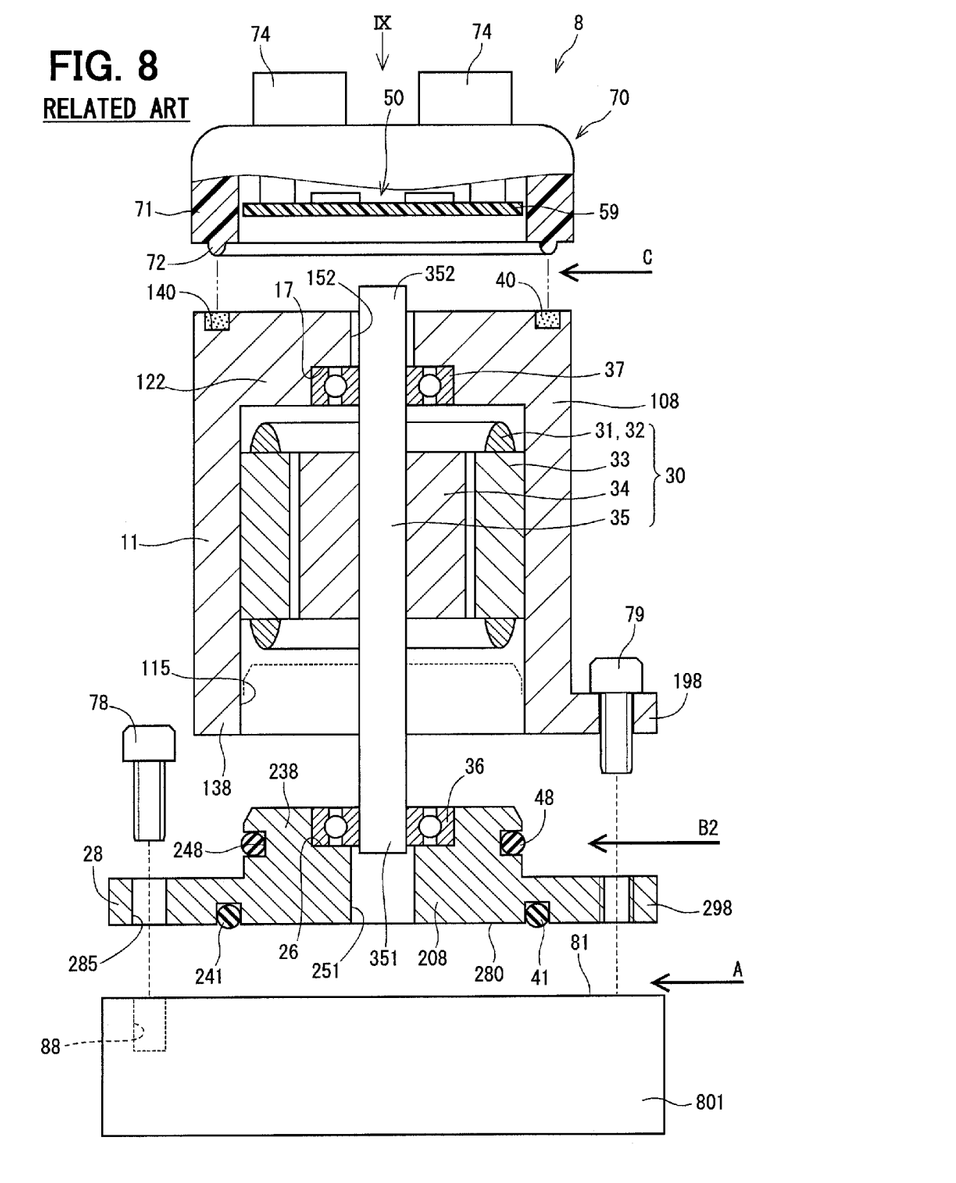
FIG. 8 is a schematic cross-sectional view of a drive apparatus of a second comparative example.

The drive apparatus 8 has three sealing locations A, B2, C, which are shown in FIG. 8 and need to have the water tightness to limit intrusion of the water from the outside. The O-ring 41 is used at the sealing location A between the closure 208 and the gear box 801. The O-ring 48 is used at the sealing location B2 between the closure 208 and the motor case 108. The bonding agent 40 is used at the sealing location C between the control device cover 70 and the closure 208.

Here, it should be noted that the drive apparatus 2, 3 of the second and third embodiment is similar to the drive apparatus 8 of the second comparative example with respect to the sealing location C. However, the closure 202 is constructed to be fitted to the inner wall 115 of the tubular section on the inner side of the opening edge part 132, 133. Therefore, at the sealing location A, the gap between the motor case 102, 103 and the gear box 802, 803 is directly sealed by the O-ring 42, 43 in the second and third embodiments. Thus, it is possible to eliminate the O-ring 48, which is the seal (the sealing means) at the sealing location B2, and thereby it is possible to reduce the number of the sealing locations to two. As a result, the locations, which need to guarantee the waterproof quality, are reduced, and thereby the reliability is improved. Furthermore, the number of assembling steps of the seals (sealing means) can be reduced.

The sealing location A and the sealing location C serve as the first sealing location and the second sealing location, respectively, of the present disclosure.

Furthermore, similar to the first embodiment, the surface treatment process of the closure 202 is not required. Also, similar to the first embodiment, the bonding agent 40 is used as the secondary seal (the secondary sealing means), and each of the O-ring 42, 43 and the bonding agent 40 is placed on the inner side of the outer contour of the motor case 102, 103 in a radial direction of the motor case 102, 103. Thus, it is possible to eliminate the radially outwardly projected portion (e.g., the flange), and thereby it is possible to minimize the maximum outer diameter of the drive apparatus 2, 3 like in the first embodiment.

Embodiment(s) in View of Real Distribution Process

With respect to the O-ring, which serves as the primary seal (the primary seal means) and seals between the motor case and the gear box, there are three possible cases (a) to (c). In the first case (a), the O-ring is installed to the drive apparatus at the parts manufacturer, and the drive apparatus having the O-ring is delivered to the automobile manufacturer. In the second case (b), the drive apparatus and the O-ring are separately prepared as a set of components and are delivered to the automobile manufacturer. In the third case (c), the automobile manufacturer obtains the O-ring through its own route in a case where the O-ring is a standardized product. In the second embodiment, the cases (a), (b) and (c) are all possible. In the first embodiment, in a case where an appropriate countermeasure is taken to limit unintentional detachment of the O-ring 41 from the O-ring groove 141, the first case (a) is possible. If the countermeasure is not taken to limit the unintentional detachment of the O-ring 41 from the O-ring groove 141, the second case (b) or the third case (c) is possible. In the third embodiment, the second case (b) or the third case (c) is possible.

A person skilled in the art may appropriately select one of these cases in the distribution, and the above differences in the distribution process do not affect the technical scope of the present disclosure of the drive apparatus. That is, even if the O-ring, which serves as the primary seal (the primary sealing means), is not yet installed in the drive apparatus during the manufacturing of the drive apparatus at the parts manufacturer, it is regarded that the first sealing location, in which the primary seal (the primary seal means) is applied, exists in a case where it is inevitably predicted that the O-ring is installed in the drive apparatus at the time of fixing the drive apparatus to the installation subject in the future in view of the technical common sense of the person skilled in the art.

Other Embodiments (A) The seal member, which is used as the primary seal (the primary seal means) for sealing between the motor case and the installation subject, may be, for example, a packing or a gasket besides the O-ring discussed in the above embodiments.

Furthermore, the number of the primary seal (the primary sealing means) is not limited to one. For example, in the case of the structure having the face seal like in the face seal of the first embodiment, two or more concentric O-rings, such as an O-ring of a large diameter and an O-ring of a small diameter, may be used. In the case of the structure having the shaft seal like the shaft seal of the second and third embodiments, a plurality of O-rings, each of which has an identical diameter, may be placed one after another in the axial direction. Alternatively, two or more seals (sealing means) of different types may be combined.

(B) The secondary seal (the secondary sealing means), which seals between the control device cover and the motor case, may be another type of seal member, such as an O-ring, in place of the bonding agent of the above embodiments. In such a case, the connection between the control device cover and the motor case may be a connection that uses radial fitting (fitting between the control device cover and the motor case that results in a radial contact between the control device cover and the motor case), and a structure of a shaft seal may be used. Furthermore, similar to the primary seal (the primary sealing means), a plurality of secondary seals (secondary sealing means) may be used.

(C) In the drive apparatus of the present disclosure is not limited to have the structure discussed in the above embodiments with respect to the features, which are other than that "the closure is fitted to the inner wall of the tubular section on the inner side of the opening edge part", and "the sealing locations, at each of which the seal (the sealing means) is used, include the two sealing locations that include the first sealing location between the motor case and the installation subject and the second sealing location between the control device cover and the motor case."

For example, in FIG. 2 of the above embodiment, the drive apparatus, which includes the two sets of windings 31, 32 and the two systems of the inverters (two system inverters) 601, 602, is exemplified. Alternatively, the drive apparatus may be a drive apparatus, which includes one set of windings or three or more sets of windings and a corresponding number of system(s) of inverter(s), which corresponds to the number of set(s) of the windings.

(D) The electric motor, which is the motor unit of the present disclosure, is not limited to the three-phase AC brushless synchronous motor of the permanent magnet type. For example, the electric motor may be a multi-phase electric motor having four or more phases, or a DC brushless motor, or an induction motor. In a case of the electric motor, which does not need to sense the rotational position of the rotor, the magnet at the end surface of the shaft and the rotational angle sensor may be eliminated.

Furthermore, the motor unit of the present disclosure is not limited to the electric motor, which receives the electric power and generates the torque. That is, the motor unit of the present disclosure should be interpreted as a dynamoelectric machine unit that may have a function of an electric motor, which receives the electric power and generates the torque, and/or a function of an electric power generator, which receives a torque and generates an electric power.

(E) The application of the drive apparatus of the present disclosure is not limited to the electric power steering system of the rack installation type. For example, the drive apparatus of the present disclosure may be applied to an electric power steering system of a column installation type (i.e., an electric power steering system, in which the drive apparatus is mounted to the steering shaft that is also referred to as a steering column). Furthermore, the drive apparatus of the present disclosure may be applied to any other on-vehicle apparatus, which is other than the electric power steering system, or may be applied to an apparatus, which is other than the on-vehicle apparatuses. The installation subject may be any other type of load, such as a gear box or a pulley box, which has a drive force transmission mechanism installed therein.

As discussed above, the present disclosure is not limited to the above embodiments and the modifications thereof. That is, the above embodiments and modifications thereof may be further modified in various ways without departing from the principle of the present disclosure.

What is claimed is:

1. A drive apparatus comprising:
a motor unit that includes a stator, around which at least one winding is wound, a rotor, which is rotatably placed on an inner side of the stator, and a shaft, which is rotatable integrally with the rotor;
a control device that controls energization of the motor unit;
a motor case that is installable to an installation subject, wherein the motor case is configured into a cup form and includes a tubular section and a bottom plate section, which are integrally formed, and the motor case receives the motor unit at an inside of the tubular section;
a closure that is entirely received in the motor case and is fitted to an inner wall of the tubular section on an inner side of an opening edge part of the motor case, which is opposite from the bottom plate section, wherein the closure is formed in one piece and includes:
a recess that is recessed away from the stator in an axial direction of the shaft and receives a bearing that rotatably supports the shaft; and
a shaft hole that extends in the axial direction from the recess on an opposite side of the bearing that is opposite from the stator in the axial direction while the shaft hole receives a portion of the shaft; and
a control device cover that is fixed to an end portion of the motor case, which is opposite from the installation subject, wherein the control device cover covers the control device, wherein:
the drive apparatus has a plurality of sealing locations, at each of which intrusion of water from an outside is limited after fixation of the drive apparatus to the installation subject; and
the plurality of sealing locations includes two sealing locations that include:
a first sealing location where a primary seal, which fluid-tightly seals between the motor case and the installation subject, is placed; and
a second sealing location where a secondary seal, which fluid-tightly seals between the control device cover and the motor case, is placed.

2. The drive apparatus according to claim 1, wherein:
the bottom plate section is formed at a side of the motor case where the installation subject is placed;
the primary seal is placed between the bottom plate section of the motor case and the installation subjection; and
the secondary seal is placed between the control device cover and the opening edge part of the motor case.

3. The drive apparatus according to claim 1, wherein:
the bottom plate section is formed at a side of the motor case where the control device cover is placed;
the primary seal is placed between the opening edge part of the motor case and the installation subject; and
the secondary seal is placed between the control device cover and the bottom plate section of the motor case.

4. The drive apparatus according to claim 1, wherein the primary seal and the secondary seal are placed on an inner side of an outer contour of the motor case in a radial direction of the motor case.

5. The drive apparatus according to claim 1, wherein the secondary seal is a bonding agent.

* * * * *